US012104691B2

(12) United States Patent
Schiegg et al.

(10) Patent No.: US 12,104,691 B2
(45) Date of Patent: Oct. 1, 2024

(54) DEVICE, METHOD AND MACHINE LEARNING SYSTEM FOR DETERMINING A STATE OF A TRANSMISSION FOR A VEHICLE

(71) Applicant: Robert Bosch GmbH, Stuttgart (DE)

(72) Inventors: Martin Schiegg, Korntal-Muenchingen (DE); Muhammad Bilal Zafar, Berlin (DE); Roman Dominik Kilgus, Stuttgart (DE); Sebastian Gerwinn, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 925 days.

(21) Appl. No.: 17/156,088

(22) Filed: Jan. 22, 2021

(65) Prior Publication Data

US 2021/0237745 A1   Aug. 5, 2021

(30) Foreign Application Priority Data

Feb. 3, 2020 (EP) .................................. 20155186

(51) Int. Cl.
*F16H 59/66* (2006.01)
*F16H 61/00* (2006.01)
*F16H 61/02* (2006.01)

(52) U.S. Cl.
CPC ............. *F16H 59/66* (2013.01); *F16H 61/02* (2013.01); *F16H 2061/0087* (2013.01); *F16H 2061/0093* (2013.01)

(58) Field of Classification Search
CPC .. F16H 59/66; F16H 61/02; F16H 2061/0087; F16H 2061/0093;

(Continued)

(56) References Cited

U.S. PATENT DOCUMENTS 5,557,521 A    9/1996  Danz et al.
2015/0344036 A1* 12/2015 Kristinsson ....... B60W 50/0097
                                                              701/22

(Continued)

FOREIGN PATENT DOCUMENTS

DE  102006007717 A1   8/2007
WO  2019127231 A1    7/2019

OTHER PUBLICATIONS

Cooperation-Aware Lane Change Maneuver in Dense Traffic based on Model Predictive Control with Recurrent Neural Network research paper; Bae et al; filed Sep. 29, 2019; pp. 1-8. (Year: 2024).*

*Primary Examiner* — Tisha D Lewis
(74) *Attorney, Agent, or Firm* — NORTON ROSE FULBRIGHT US LLP; Gerard A. Messina

(57) ABSTRACT

A method for determining a state of a transmission for a vehicle includes providing an input for a first generative model depending on a route information, a vehicle speed, a probabilistic variable, and an output of a second physical model, and determining an output of the first model characterizing the state of the transmission in response to the input for the first model. The first model includes a first layer trained to map input to an intermediate state and a second layer trained to map the intermediate state to the state of the transmission depending on the output of the second model. The method includes providing an input for the second physical model depending on at least one vehicle state and/or the route information, and determining an output of the second model in response to the input for the second model. The output of the second model characterizes limit(s) for the intermediate state.

14 Claims, 4 Drawing Sheets

(58) Field of Classification Search
CPC ....... F16H 2059/666; F16H 2061/0075; F16H 2061/0084; F16H 61/0213; F16H 59/44; F16H 59/50; F16H 2059/663; G06N 3/044; G06N 3/045; G06N 3/047; G06N 3/08; G06N 20/00; G06F 18/214; G06F 18/24133
See application file for complete search history.

(56) References Cited

U.S. PATENT DOCUMENTS

2018/0364725 A1* 12/2018 Lonari ................. G05D 1/0291
2018/0365533 A1   12/2018 Sathyanarayana et al.

* cited by examiner

DEVICE, METHOD AND MACHINE LEARNING SYSTEM FOR DETERMINING A STATE OF A TRANSMISSION FOR A VEHICLE

CROSS REFERENCE

The present application claims the benefit under 35 U.S.C. § 119 of European Patent Application EP 20155186.8 filed on Feb. 3, 2020, which is expressly incorporated herein by reference in its entirety.

BACKGROUND INFORMATION

To enable the prediction of a gear to be engaged in the future in an engine-driven vehicle, wherein the vehicle has a transmission comprising at least two selectable gears for the transmission and/or reduction of an engine torque, German Patent Application No. DE 10 2006 007717 A1 describes that a current driving situation is detected and evaluated and, depending on the evaluation of the current driving situation, a probability value is determined for at least two gears and the gear for which the highest probability value was determined is predicted.

U.S. Pat. No. 5,557,521 A describes a control system for changing automatic gears that operates according to fuzzy logic methods. All the fuzzy-production rules are divided into at least three sections: a set of basic rules to determine the gear-changing point in a consumption-oriented driving style, a set of adaptation rules to modify the set of basic rules depending on a current driving style and an identification set of rules for classifying the driver according to his/her driving style.

PCT Application No. WO 2019/127231 A1 describes a method to generate training data for machine learning, the method comprising: Generating simulated training data for a target neural network and transforming, with a training data transformer, the simulated training data form transformed training data, the training data transformer trained to increase a conformance of the transformed training data and the simulated training data; and training the target neural network with the transformed training data.

Physical models or probabilistic models may be used to determine various aspects of vehicle transmission systems. While physical models are deterministic, their accuracy depends on the observability of the system that is modelled. Probabilistic models may model unobservable behavior. However, it is difficult to prove that the states of transmission predicted by the probabilistic model are physically viable.

It is desirable to determine a state of a transmission for a vehicle reliably and accurately.

SUMMARY

This may be achieved by the method, the device and the machine learning system according to example embodiments of the present invention.

In accordance with an example embodiment of the present invention, a method for determining a state of a transmission for a vehicle comprises providing an input for a first in particular generative model depending on a route information, a vehicle speed, a probabilistic variable, in particular noise, and an output of a second in particular physical model, determining an output of the first model in response to the input for the first model, wherein the output of the first model characterizes the state, wherein the first model comprises a first layer that is trained to map input for the first model determined depending on the route information, the vehicle speed and the probabilistic variable to an intermediate state, wherein the first model comprises a second layer that is trained to map the intermediate state to the state depending on the output of the second model, providing an input for the second physical model depending on at least one vehicle state and/or the route information, determining an output of the second model in response to the input for the second model, wherein the output of the second model characterizes at least one limit for the intermediate state. The first model is a generative model. The second layer output depends on the output of the second model. The second layer may apply physical limits to the intermediate output of the first layer. The second layer may also contain a conversion, e.g., from an acceleration to a velocity. The second model provides at least one limit for the output of the generative model. The limit depends on physical constraints. Therefore, the accuracy and reliability of the state for the transmission, e.g., the gear, is significantly improved. A further advantage over purely data-based models is that the relations modeled in the physical model help to extrapolate the model to characteristics of test data that were not present in the training data of the data-based model. For example, if only 6 gear-vehicles are available in the training data and at test time, gears for a 5 gear-vehicle are generatable as well. The physical model helps to make a useful transition to this new unseen test case.

Preferably, the at least one vehicle state is defined by at least one geographical variable, in particular at least one slope trajectory value, or at least one vehicle variable, in particular at least one velocity trajectory value. Route information such as slope of a road or velocity of a vehicle provide physical information that can be used to determine limits for a gear of the transmission.

Preferably, the at least one vehicle state is defined by at least one vehicle parameter, in particular at least one of a transmission gear ratio, a differential gear ratio, a tire circumference, a vehicle engine idle speed, a safety margin, a slope, a velocity, an engine speed, a power required by an auxiliary device, a vehicle resistance and a vehicle engine full-load power-speed curve. These vehicle parameters provide physical information that can be used by the physical model to determine limits for a gear of the transmission.

Preferably, the route information comprises route features, wherein the method comprises extracting the route features from map information. These route features can improve the mapping of the generative model.

Preferably, the route information comprises at least one of: a geographical characteristic, in particular an absolute height or a road slope characteristic, and a traffic flow characteristic, in particular a time dependent average speed of traffic, and a road characteristic, in particular a number of lanes, road type and/or road curvature, and a traffic control characteristic, in particular a speed limit characteristic, a number of traffic lights, a number of traffic signs of a specific type, a number of stop signs, a number of yield signs and/or a number of pedestrian crossing signs, and a weather characteristic in particular an amount of rain at a predetermined time, a wind speed and/or a presence of fog. This information may be used for predicting a gear of the vehicle transmission by the generative model and for training of the generative model.

Preferably, the method comprises providing an input for a third model depending on the route information, the vehicle speed and the state, determining an output of the third model in response to the input for the third model, wherein the output of the third model characterizes a score indicating an estimate of veracity for the state, wherein the third model is trained to map input for the third model determined depending on the route information, the vehicle speed and the state to output of the third model characterizing a score indicating an estimate of veracity for the state. The score may output a true or false information regarding whether a gear time series represented by output determined for a time period matches a real world gear time series of the transmission for the same speed limit and slope in the time period.

Preferably, the route information and the vehicle speed are defined by a continuous or discrete series of values over time within a time period, wherein the first model comprises a first Recurrent Neural network adapted to process values of the series of values of the time period and the third model comprises a second Recurrent Neural network adapted to process values of the series of values of the time period, wherein the method comprises processing the same values of the route information and the vehicle speed in the series of values of the time period by both, the first model and the third model.

Preferably, the probabilistic variable and the state are defined by a continuous or discrete series of values over time within the time period.

Preferably, the method comprises determining a characteristic of gears over time depending on a plurality of inputs for the second model and depending on a plurality of inputs for the first model.

Preferably, the method comprises estimating an exhaust characteristic for a vehicle depending on the characteristic of gears over time and/or the score, and depending on a vehicle engine model.

In accordance with an example embodiment of the present invention, a corresponding device comprises at least one processor and storage that are adapted to execute steps of the example method(s).

In accordance with an example embodiment of the present invention, a machine learning system comprises the first model, the second model and the third model and is adapted to perform the steps of the example method (s).

In accordance with an example embodiment of the present invention, a method of training the machine learning system, comprises that the state is determined depending on output of the first model and the second model in response to training data defining input data for the first model and the second model, wherein the output of the third model characterizing the score indicating a degree estimate of veracity for the state is determined, and wherein at least one parameter of the first model, the second model and/or the third model is determined depending on the score, wherein the input data for a training cycle comprises the state, the route information and the at least one vehicle state. The physical model represented by the second model may have free parameters that need to be tuned. In this aspect, exactly the same training algorithm may be used to train these when the first model is trained.

Further advantageous aspects of the present invention can be derived from the following description and the figures.

DETAILED DESCRIPTION OF EXAMPLE EMBODIMENTS

Figure 1:
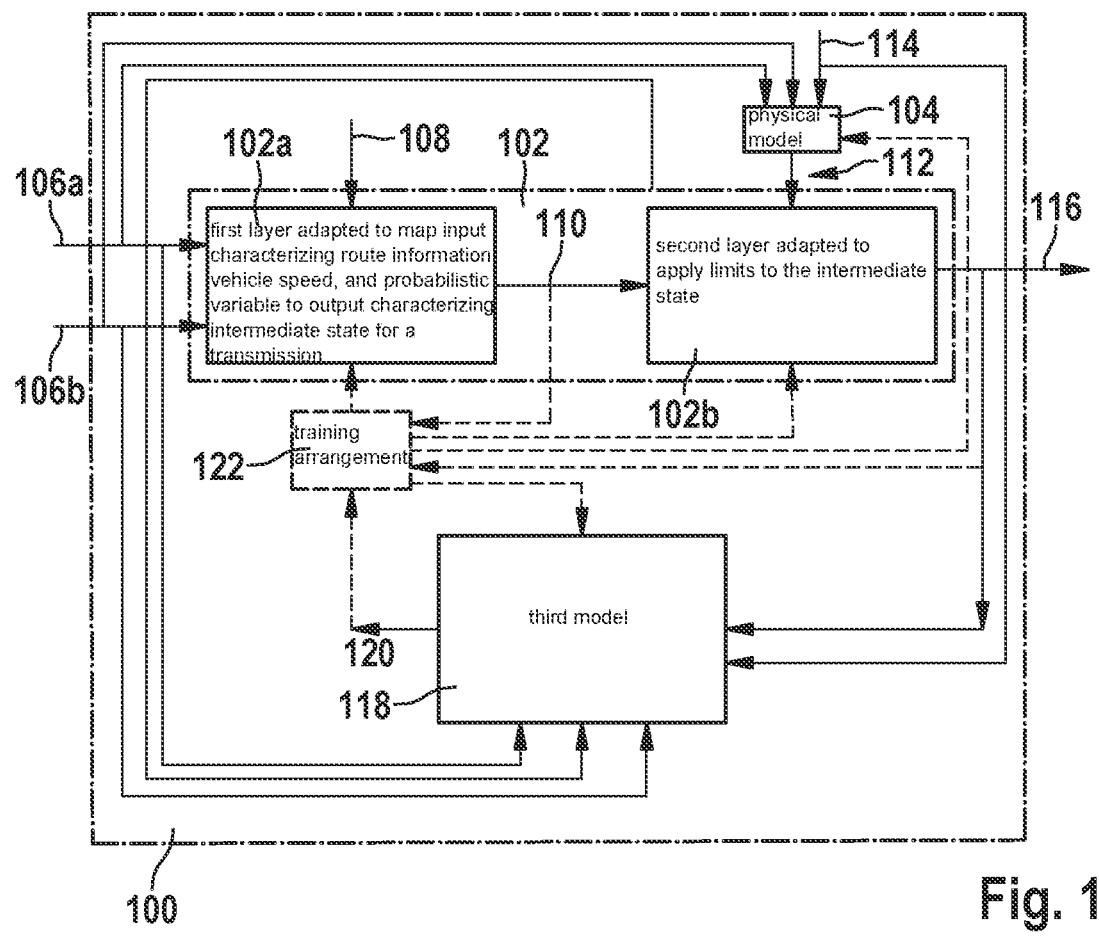
FIG. 1 schematically depicts a device for determining a state of a transmission for a vehicle, in accordance with an example embodiment of the present invention.

FIG. 1 schematically depicts a device 100 in accordance with an example embodiment of the present invention. The device 100 may comprise at least one processor and storage that may be adapted for executing models and steps of a method that will be described below.

The device 100 comprises a first in particular generative model 102 and a second in particular physical model 104.

The first model 102 is a data-based model. The first model 102 comprises a first layer 102a that is adapted to map input characterizing a route information 106a, a vehicle speed 106b and a probabilistic variable 108, in particular noise, to output characterizing an intermediate state 110 for a transmission of a vehicle. The input characterizing the route information 106a and the vehicle speed 106b is a series of state variables. The intermediate state 110 in the example is a series of state variables indicative of a generated unconstrained gear.

The route information 106a may be determined, e.g., from a sequence of longitude and latitude coordinates. The route information 106a in the example comprises map features. Map features may comprise a speed limit, a topological information such as slope. The map features may comprise weather conditions. The map features may comprise at least one of: a geographical characteristic, in particular an absolute height or a road slope characteristic, a road slope characteristic, and a traffic flow characteristic, in particular a time dependent average speed of traffic, and a road characteristic, in particular a number of lanes, road type and/or road curvature, and a traffic control characteristic, in particular a speed limit characteristic, a number of traffic lights, a number of traffic signs of a specific type, a number of stop signs, a number of yield signs and/or a number of pedestrian crossing signs, and a weather characteristic in particular an amount of rain at a predetermined time, a wind speed and/or a presence of fog.

The second model 104 is adapted to determine output characterizing at least one limit 112 for the intermediate state 110 depending on at least one vehicle state 114 and/or route information 106a, in particular the slope.

The device 100 is adapted for determining a state 116 of the transmission, in particular a gear for the vehicle. The transmission may comprise a clutch or a torque converter at least one driving gear and several pinions. The gear of the transmission in the example refers to a fixed transmission ratio resulting from a selected combination of driving gear and pinion. In the example, the state 116 is a series of state variables indicative of six forward driving gears by one of the integer values 1, 2, 3, 4, 5, 6 for each time step. For example, a gear value for each and every time step is generated in particular with the same discretization as the input data, e.g., the route information 106a. A reverse driving gear, neutral or park position may be indicated likewise by other integer values. For a continuous transmission system the gear may be a continuous floating point variable indicating, e.g., an actual transmission ratio instead.

The first model 102 is a generative model for predicting output characterizing the state 116. The second model 104 comprises a physical model for physically modelling plausible gears and for determining limits based thereon. The first model 102 comprises a second layer 102b that is adapted to apply the limits to the intermediate state 110 that is a generated by the first layer 102a of the first model 102.

The first layer 102a, and the second layer 102b in this context are model layers, i.e., components of the first model 102. The term layer in this context does not correspond to one layer in a neural network but one model layer may consist of multiple neural network layers.

The device 100 is in this aspect adapted to limit the output of the generative first model 102 by a limit that depends on physical constraints. The second model 104 enriches the purely data-based generator output of the first model 102 with prior knowledge from physics. This provides a "hybrid" model as it combines a data-based model with a physics-based model.

The device 100 may comprise a third model 118. The third model 118 may be a data-based model. The third model 118 is adapted to map input characterizing the route information 106a, the vehicle speed 106b and the state 116 to output characterizing a score 120 indicating an estimate of veracity for the state 116. The score may output a true or false information regarding whether the gear represented by the output matches a real world gear of the transmission for the same speed limit and slope. The score is not necessarily binary. The score may be a regression value, for instance positive for true, negative for false.

The device 100 may comprise a training arrangement 122 adapted to determine at least one parameter of the first model 102 and/or the second model 104 depending on the score 120. In the example, for training the first model 102 a gradient descent method, e.g., ADAM, may be iteratively repeated based on training data for training the first model 102 to map input characterizing the route information 106a, the vehicle speed 106b and the probabilistic variable 108 to output characterizing the intermediate state 110 characterizing a predicted gear or transmission ratio of the transmission. The third model 118 may be trained. Input data for the training may comprise the state 116, the route information 106a, the vehicle speed 106b and/or the at least one vehicle state 114. Training in this context refers to determining parameters for either the first model 102 or the third model 118 or both alternately depending on the training data. Input data for a training cycle may comprise the state 116, the route information 106a, the vehicle speed 106b and the at least one vehicle state 114.

The device 100 in one example comprises a Generative Adversarial Network, wherein the first model 102 and the second model 104 are configured as Generator and trained and the third model 118 is configured and trained to score the realness or fakeness of a given state 116. A Jenson-Shannon divergence, in particular a regularized Jenson-Shannon divergence, may be used as objective function for training the Generative Adversarial Network. In one example the Generative Adversarial Network is a Wasserstein Generative Adversarial Network. In this case, the third model 118 is a critic or discriminator that scores the realness or fakeness of the state 116 depending on the Wasserstein distance. A regularized Wasserstein distance may be used.

The Generative Adversarial Network is for example set up as follows:

Given some real data $(x, c) \sim P_{x,c}$ based on gears x and environment conditions c the Generative Adversarial Network learns to draw samples from a distribution $Q_{x|c}$. A generator network $g(z)$ is trained to sample from the distribution $Q_{x|c}$ using another distribution $Q_{x,c} = Q_{x|c} P_c$ that approximates the real data distribution $P_{x,c}$. More specifically, the discrepancy $div(P_{x,c}, Q_{x,c})$ is minimized via adversarial training. The discrepancy in the example is the Wasserstein distance or the Jenson-Shannon divergence, in particular a regularized Jenson-Shannon divergence. Given the generator network g and a critique f this corresponds to the following minimax objective:

$$\min_{g} \max_{f \in F} V(P_{x,c}, Q_{x,c})$$

wherein the $\max_{f \in F} V(.)$ means estimating the divergence, which the generator tries to minimize. The Wasserstein distance is defined for example as $$W(P_{x,c}, Q_{x,c}) = \sup_{f \in F} E_{(x,c) \sim P_{x,c}}[f(x,c)] - E_{z \sim P_z, c \sim P_c}[f(g(z,c),c)]$$

where F consists of all 1-Lipschitz functions, i.e., $F = \{f: \|f\|_L \leq 1\}$.

Hence the min max objective is $$\min_{g} \max_{f \in F} E_{(x,c) \sim P_{x,c}}[f(x, c)] - E_{z \sim P_z, c \sim P_c}[f(g(z, c), c)]$$

Figure 2:
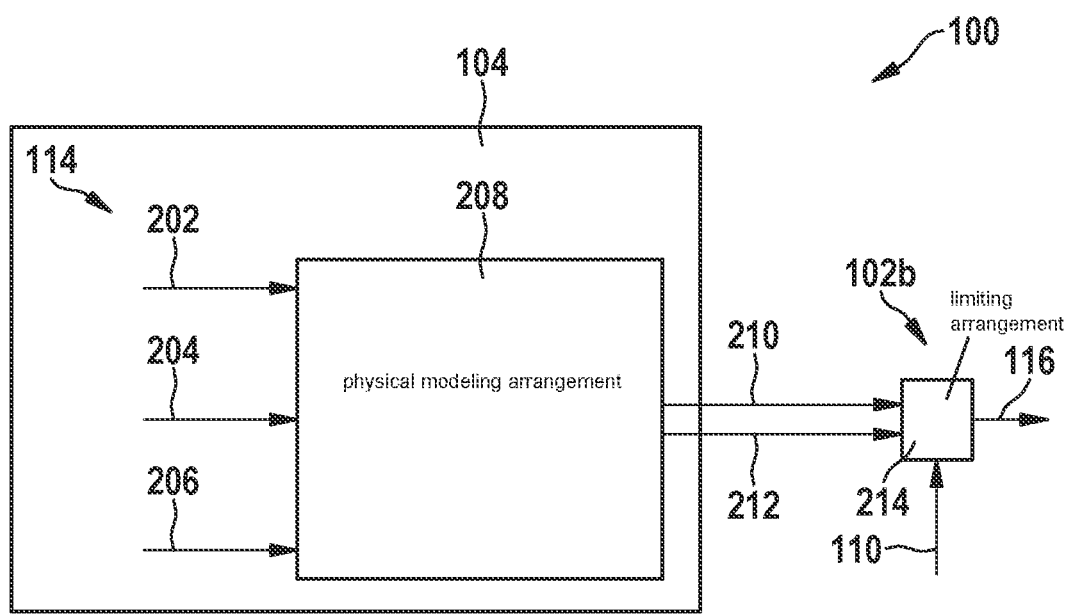
FIG. 2 schematically depicts aspects of the models, in accordance with an example embodiment of the present invention.

Further aspects of the models are described in further detail referencing FIG. 2.

The at least one vehicle state 114 may be defined by at least one vehicle parameter 202, in particular at least one of a transmission gear ratio, a differential gear ratio, a tire circumference, a vehicle engine idle speed, a safety margin, a slope, a velocity, an engine speed, a power required by an auxiliary device or auxiliary devices, a vehicle resistance and a vehicle engine full-load power-speed curve. These vehicle parameters provide physical information that can be used by the physical model to determine limits for a gear of the transmission.

The at least one vehicle state 114 may be defined by at least one geographical variable 204, in particular at least one slope trajectory value, or at least one vehicle variable 206, in particular at least one velocity trajectory value.

The second model 104 comprises a physical modeling arrangement 208 adapted to model the at least one limit 112. In the example, the at least one limit 112 is a hard physical constraint on a continuous or discrete gear output. In the example, a minimum gear 210 for a time step and a maximum gear 212 for the time step is determined. The at least one limit 112 may only be a minimum gear or only be a maximum gear for one or all time steps.

The second layer 102b may comprise a limiting arrangement 214. The limiting arrangement 214 in the example is defined by a limiting function depending on the minimum gear 210 and the maximum gear 212 as:

$$x'_t = \sigma(x_t; \theta) \times (\bar{x}_t - \underline{x}_t) + \underline{x}t$$

wherein $\sigma(x_t; \theta)$ is a function squashing $x_t$ to [0, 1] parameterized by $\theta$ for instance $$\sigma(x_t; \theta) = \frac{1}{1 + e^{-\theta x_t}}$$

wherein $\underline{x}_t$ characterizes the minimum gear 210, $\bar{x}_t$ characterizes the maximum gear 212, $x_t$ characterizes the intermediate transmission state 110 and $x'_t$ characterizes the transmission state 116. In the example the gear output is discrete. In this example, $x'_t$ is discretized, e.g., by rounding $x'_t$ to the nearest closest integer. As an alternative, discrete values may be determined depending on a softmax function. This requires masking with respect to the minimum/maximum ranges. Masking in this context refers to masking out values outside of the limits during training. $\theta$ characterizes parameters in this formula that might be tuned during training of the Generative Adversarial Network. Alternatively, it could also be set to a constant, in particular 1, and not tuned during training. In the example, the intermediate transmission state 110 and the transmission state 116 are contained in one aspect by time-series of values. The limiting arrangement 214 in the example is adapted to output the transmission state 116 determined by the limiting function.

The route information 106a may comprise route features. In this aspect, the device 100 may be adapted to extract the route features from map information. These route features can improve the mapping of the generative model.

The route information 106a may comprise at least one of: a geographical characteristic, in particular an absolute height or a road slope characteristic, a road slope characteristic, and a traffic flow characteristic, in particular a time dependent average speed of traffic, and a road characteristic, in particular a number of lanes, road type and/or road curvature, and a traffic control characteristic, in particular a speed limit characteristic, a number of traffic lights, a number of traffic signs of a specific type, a number of stop signs, a number of yield signs and/or a number of pedestrian crossing signs, and a weather characteristic in particular an amount of rain at a predetermined time, a wind speed and/or a presence of fog. This information may be used for predicting a gear of the vehicle transmission by the generative model and for training of the generative model.

The route information 106a and the vehicle speed 106b may be defined by a continuous or discrete series of values over time within a time period. The time period in the example is dividable in time steps comprising values for determining the transmission state 116. In the example, one transmission state 116 is determined per time step.

Route information such as slope of a road or velocity of a vehicle provide physical information can be used to determine limits for a gear of the transmission.

In the example, the probabilistic variable 108 and the state 116 are defined by a continuous or discrete series of values over time within the time period.

Figure 3:
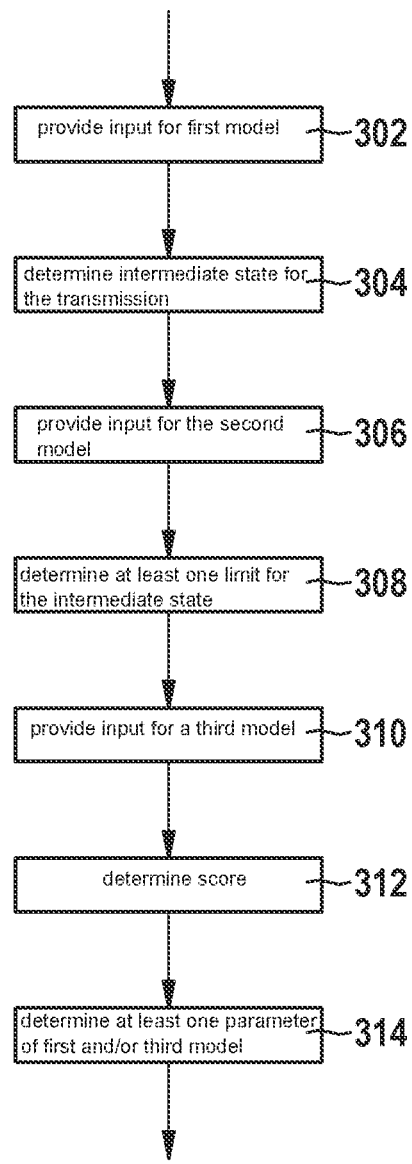
FIG. 3 schematically depicts steps in a method for determining the state variable, in accordance with an example embodiment of the present invention.

The example method described below with reference to FIG. 3 assumes that a trained first model 102 is implemented. In one aspect of the present invention, the third model 118 may be present in particular during training. However, after the training, the first model 102 and the second model 104 may be used independently from the third model 118.

The first model 102 and the third model 118 in the example comprise Recurrent Neural networks. The Recurrent Neural network may be implemented as a Long Short Term Memory network, a Gated recurrent unit, a Transformer architecture, or a vanilla Recurrent Neural network.

The first model 102 comprises a first Recurrent Neural network adapted to process values of the series of values of the time period.

The third model 118 comprises a second Recurrent Neural network adapted to process values of the series of values of the time period. The device 100 is adapted to process the same value of the route information 106a and the vehicle speed 106b in the first model 104 and the third model 118. In the example the first model 102 and the third model, 118 are adapted to process the same value of the route information 106a and the vehicle speed 106b in the series of values of the time period in the same cycle. The second model 104 may be adapted to provide the output to the first model 102 based on the route information 106a for the same cycle. The device 100 is adapted to process the third model 118 using the output of the first model 102 of the same cycle as input for the third model 118 in the same cycle.

The method of determining the state 116 of the transmission for a vehicle comprises a step 302 of providing an input for the first model 102 depending on the route information 106a, the vehicle speed 106b and the probabilistic variable 108. In the example, the probabilistic variable is noise, e.g., white noise.

Afterwards, in a step 304 the intermediate state 110 for the transmission is determined depending on an output of the first model 102 in response to the input for the first model 102. The output of the first layer 102a of the first model 102 characterizes the intermediate state 110. In the example, the input for the first layer 102a of the first model 102 that is determined from the route information 106a, the vehicle speed 106b and the probabilistic variable 108 is mapped to the output of the first layer 102a characterizing the intermediate state 110. The state 116 is determined depending on the intermediate state 110 and the at least one limit 112. In the example, a value of the state 116 is determined by the second layer 102b of the first model 102 that implements the limit function.

The method further comprises a step 306 of providing an input for the second model 104 depending on the at least one vehicle state 114.

Afterwards in a step 308, at least one limit 112 for the intermediate state 110 is determined depending on an output of the second model 104 in response to the input for the second model 104. The output of the second model 104 characterizes the at least one limit 112.

The method may comprise a step 310 of providing a input for the third model 118 depending on the route information 106a, the vehicle speed 106b and the state 116 and a step 312 of determining a score 120 indicating an estimate of veracity for the state 116 depending on an output of the third model 118 in response to the input for the third model 118. The output of the third model 118 characterizes the score 120. The third model 118 in this aspect is trained to map the input for the third model 118 determined depending on the route information 106a, the vehicle speed 106b and the state 116 to the output characterizing the score 120.

The method may comprise a step 314 of determining at least one parameter of the first model 102 or of the third model 118 or both depending on the score 120.

By way of example, the at least one limit 112 is determined depending on the at least one vehicle state 114 that is defined by the at least one geographical variable 204 or at least one vehicle variable 206. The at least one geographical variable 204 may comprise at least one slope trajectory value. The at least one vehicle variable 206 may comprise at least one velocity trajectory value.

The at least one limit 112 may be determined depending the at least one vehicle state 114 that is defined by the at least one vehicle parameter 202, in particular at least one of the transmission gear ratio, the differential gear ratio, the tire circumference, the vehicle engine idle speed, the safety margin, the slope, the velocity, the engine speed, the power required by auxiliary devices, the vehicle resistance and the vehicle engine full-load power-speed curve.

Figure 4:
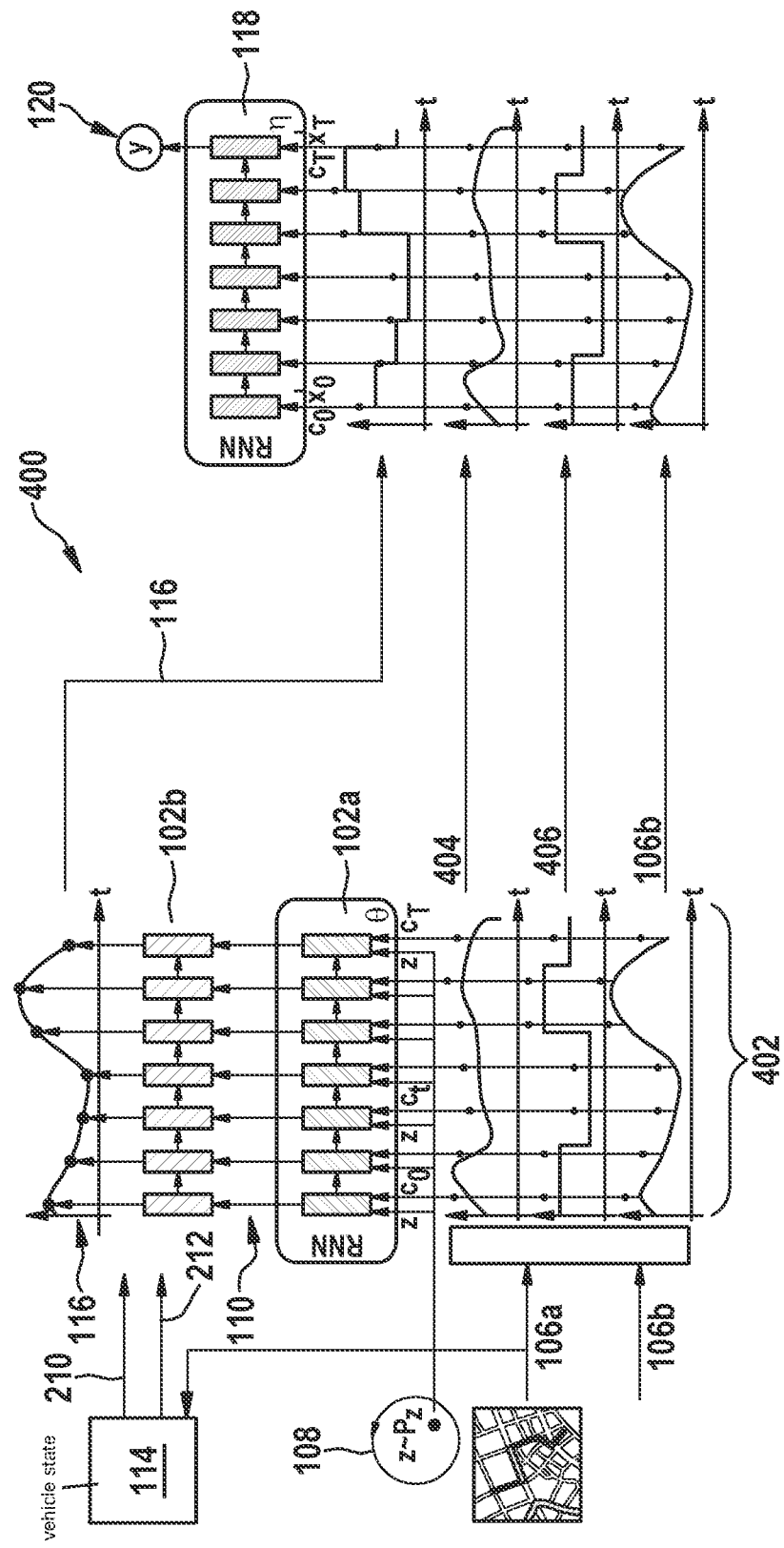
FIG. 4 schematically depicts a machine learning system, in accordance with an example embodiment of the present invention.

In FIG. 4, an exemplary machine learning system 400 for determining the state 116 is depicted schematically.

In the example the route information 106a and the vehicle speed 106b is defined by a continuous series of values over time within a time period 402. Instead of continuous series of values over time within the time period 402, the series of values may be discrete.

The route information 106a may comprise route features. At least one of the following may be used:
- a geographical characteristic, in particular an absolute height or road slope characteristic, a traffic flow characteristic, in particular a time dependent average speed of traffic, and a road characteristic, in particular a number of lanes, road type and/or road curvature;
- a traffic control characteristic, in particular a speed limit characteristic, a number of traffic lights, a number of traffic signs of a specific type, a number of stop signs, a number of yield signs and/or a number of pedestrian crossing signs;
- a weather characteristic in particular an amount of rain at a predetermined time, a wind speed and/or a presence of fog.

In FIG. 4, a road slope characteristic 404 and speed limit characteristic 406 are schematically depicted as route information 106a.

In this case, the method may comprise extracting the route features from map information. The intermediate state 110 may be determined depending on the route information 106a comprising route features in this aspect.

The first model 102 comprises the first layer 102a and the second layer 102b. The machine learning system 400 is adapted to process values of the series of values of the time period 402. The values of the probabilistic variable 108 are determined in the example as noise $z \sim P_z$ sampled from in particular a Standard normal or uniform distribution $P_z$. Any other distribution may be used as well. The input to the first layer 102a is the noise z and an input $c_i$ for i=0, ..., T wherein T is a number of discrete values in the time period 402 that is determined depending on the route information 106a and the vehicle speed 106b. In this aspect, the noise z and the input $c_i$ may be concatenated to form the input for the first layer 102a. The output of a first layer 102a in response to this input is the intermediate state 110, in the example the unlimited gear. The second layer 102b is adapted to process the intermediate state 110 to determine the state 116 depending on the output of the second model 104. In the example the minimum gear 210 and the maximum gear 212 are provided as output of the second model 104. The state 116 in a time step in this example has a specific value indicating a discrete number of a gear. A series of gears of the time 0, ..., T is represented by series of different values of the state 116.

The third model 118 is adapted to process as input for the third model 118 values of the series of values of the time period. The input to the third model 118 is the input $c_i$ that is determined depending on the route information 106a, the vehicle speed 106b and the state 116 indicated as $x'_i$. In this aspect, the input $c_i$ and $x'_i$ may be concatenated to form the input for the third model 118. This third model 118 outputs the score 120 indicating for example by y=1 the realness and by y=0 the fakeness of the state 116 in response to the input for the third model 118. In the Wasserstein Generative Adversarial Network mentioned above, y is a continuous value.

The machine learning system 400 in the example is adapted to process the same value of the route information 106a and vehicle speed 106b by both, the first model 102 and the third model 118.

Figure 5:
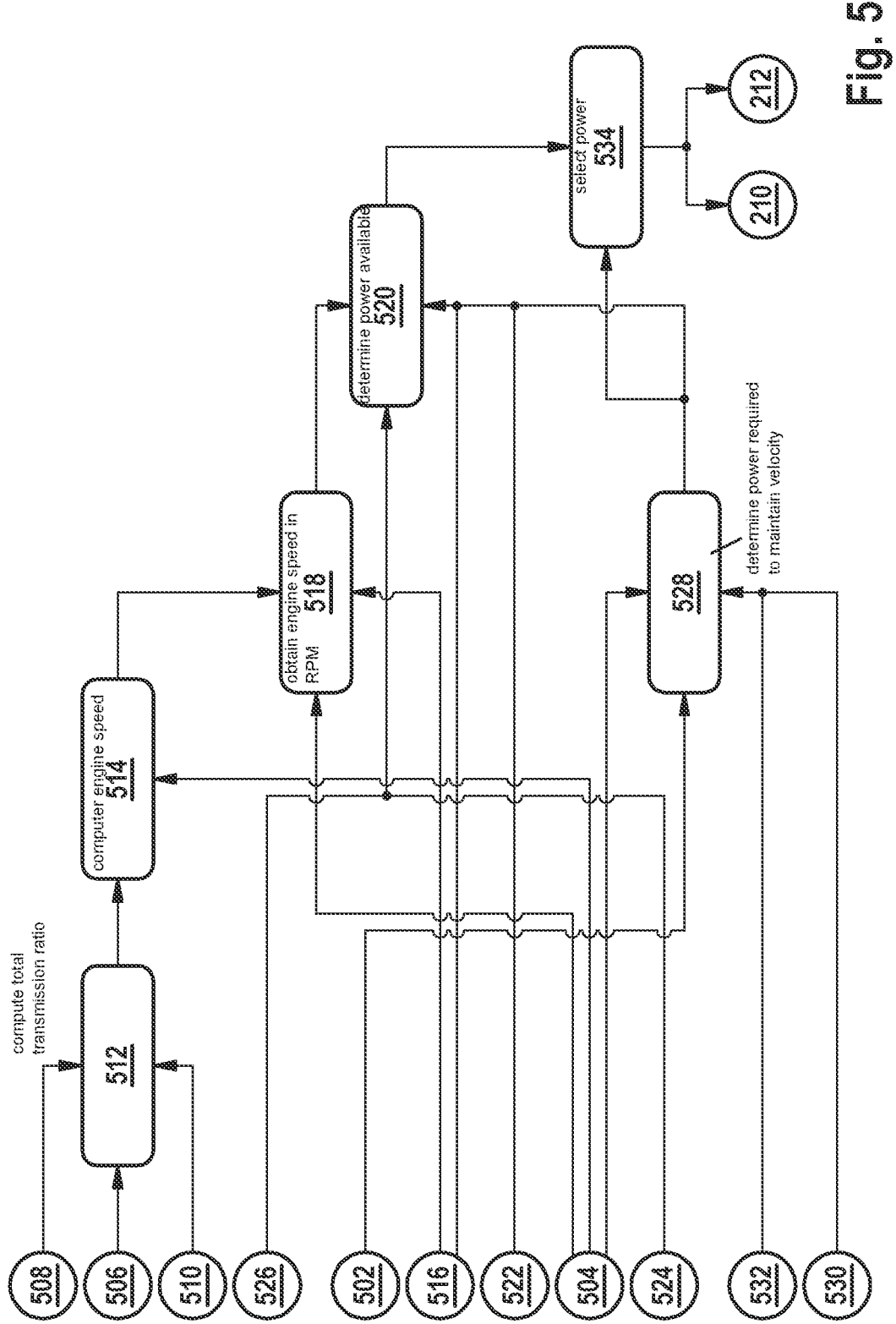
FIG. 5 schematically depicts further aspects of the physical model, in accordance with an example embodiment of the present invention.

A detailed view of the second model 104 in particular for this aspect is shown schematically in FIG. 5.

In one example, the gears to be generated are constrained only within physically plausible ranges. Given a velocity at a time step, e.g., at the time of calculating the state 116 in one of the cycles, it is possible to compute the minimum and the maximum gear that the vehicle can operate in, since different gears are capable of maintaining certain velocity ranges. These gear ranges can be computed from physical quantities such as the power available in each gear, and the power needed to maintain the target speed. Such quantities are available via a physical model 500.

The physical quantities and the interactions between them are depicted for one example in detail in FIG. 5.

The exemplary input for the calculation in a cycle comprises a cycle slope trajectory value 502 and a cycle velocity trajectory value 504. The cycle velocity trajectory value 504 is referred to as the velocity v. The cycle slope trajectory value 502 is referred to as the slope 502.

Further input parameters are a gear ratio 506, a differential ratio 508 and a tire circumference 510.

Given a velocity v at a timestep, the second model 104 computes the physically reasonable minimum plausible gear 210 and maximum plausible gear 212 as follows:

For each gear i, compute the total transmission ratio 512 as:

$$\text{total transmission ratio 512 for gear } i = \text{gear ratio 506 for gear } i * \frac{\text{differential ratio 508}}{\text{tire circumference 510}}$$

With the total transmission ratio 512 and the given velocity v, compute the (theoretical) engine speed 514 in each gear i required to drive at this velocity as:

$$\text{engine speed 514 at gear } i = \text{total ratio for gear } i * v$$

The engine speed 514 computed in the previous step may not be valid due to the usage of the clutch in, for instance, the first two gears. For instance, the driver may use the clutch when they are driving off from standstill (acceleration), or stopping to a standstill (deceleration). In this example, the first two gears are assumed to be affected by the usage of clutch. The minimum engine speeds for acceleration and deceleration may be given as an input by the domain expert or can be initialized based on an input for an engine idle speed 516 as 1.15*engine idle speed 516. Then it is computed whether the acceleration or deceleration mode applies. This may be based on the velocity v at the current and the previous timestep. Depending on the result of this computation, the engine speed 514 is either replaced with the minimum engine speed for acceleration or the minimum engine speed for deceleration.

This provides a resulting engine speed 518.

In the previous step, for each gear i, an engine speed 518 in RPM is obtained that is required to maintain the velocity v. This engine speed 518 is converted to a power 520 available in gear i. This is the power that would be generated by the engine at the resulting engine speed 518. This conversion from engine speed to power can be done via an engine full-load power-speed curve 522, which is usually available from the vehicle specifications and is provided as an input.

Before this conversion, the engine speed 518 may be capped as follows:

a. The engine speed 518 may be clipped to a maximum possible engine speed 524. The maximum possible engine speed 524 may be an input specified by the manufacturer.
b. The vehicle speed v may be adjusted to lie within some range of safety margin 526. The safety margin 526 can be set by a domain expert as input. The examples of the safety margin 526 are:
i. The engine speed should not be below the idle speed.
ii. The engine speed should not be too close to the maximum speed.

The power 520 available in gear i is determined in the example for all gears individually.

Additionally a power 528 required to maintain the velocity v is determined. This power 528 is computed as:

$$\text{power 528 required for velocity } v = \frac{R_{drive} + R_{slope} + R_{inert}}{f_{eta} * 3.6 * 1000} + P_{aux}$$

where, $$R_{drive} = f_0 + f_1 * v + f_2 * v^2$$

$$R_{slope} = m \times g \times \sin \arctan \frac{slope}{100}$$

$$R_{inert} = f_{inertia} * a * v * m$$

are respectively the driving resistance, elevation resistance and inertial resistance computed from vehicle resistances $f_0$, $f_1$, $f_2$ and an inertial force parameter $f_{inertia}$. $f_{eta}$ is a drive train efficiency factor. The vehicle resistances $f_0$, $f_1$, $f_2$ and the inertial force parameter $f_{inertia}$ and the drive train efficiency factor $f_{eta}$ may be input parameters 530 which can be obtained from vehicle specifications. $P_{aux}$ is a power used by auxiliary devices such as headlights and air conditioner. $P_{aux}$ may be an input value 532. Furthermore, a is an acceleration, which can be computed from the velocity v at the current and the previous timestep. m is a mass of the vehicle.

Based on the power 520 available at each gear i and the power 528 required for velocity v, gears 534 are selected such that the power 520 available at gear i≥power 528 required for velocity v This may result in one physically plausible gear 534 or a list of physically plausible gears 534 that satisfy this condition. From the list, the minimum gear 210 and the maximum gear 212 are obtained that are physically plausible. In case only one gear 534 is available, this gear may be used for both.

Optionally, the neutral gear or gear 0 can be added to the list of physically plausible gears. This process can be performed via heuristics. For instance, one can add the neutral gear to the physically plausible gears 534 when:

a. The vehicle is in standstill and the acceleration is 0.
b. The vehicle gradually slowed down and came to a standstill.
c. More conditions can be added by the domain experts.

Based on this second model 104, at least one vehicle state 114 can be defined by at least one vehicle parameter 202, in particular at least one of the transmission gear ratio 506, the differential gear ratio 508, the tire circumference 510, the vehicle engine idle speed 516, the safety margin 526, the slope 502, the velocity 504, the engine speed 514, the power required by the auxiliary device or auxiliary devices 532, the vehicle resistance 530 and the vehicle engine full-load power-speed curve 522.

In one aspect, a time series of values for the slope 106a and a time series $v_0, \ldots, v_T$ of values for the vehicle speed 106b is the input to both the data-based model, i.e., the first model 102, and to the physical model, i.e., the second model 104. The time series $v_0, \ldots, v_T$ may have the same source. If vehicle speed 106b denotes the time-series $v_0, \ldots, v_T$ of velocities, then one cycle velocity trajectory value 504 is a subset of values from the time series $v_0, \ldots, v_T$. The same applies to the slope, i.e., one value of the time series of values of the slope 502 is a subset of values of the slope time-series in 106a.

The machine learning system 400 computes the physically plausible range of gears $[\underline{x}_t, \overline{x}_t]$ possible at a time step t.

To ensure that the generator of the machine learning system 400 only generates gears that lie within the range $[\underline{x}_t, \overline{x}_t]$, the generated gear $x_t$, e.g., the intermediate state 110, is scaled to $x'_t$, e.g., the state value 116, using the aforementioned equation.

In case the gear generated by the first model 104, i.e., the state 116, is a continuous value, this value may be rounded to the nearest integer value after limiting it and providing it as state value 116 to the downstream task In one aspect, by exploiting prior knowledge from physics, gear traces may be generated from output of the physical model, i.e., the second model 104. For the gear traces that are generated this way, it is ensured that the generated gear traces are within physically plausible ranges. Thus, these gear traces have a higher accuracy than, e.g., traces that are generated by the first model 102 only.

The training of the Generative Adversarial Network comprising the second model 104 is faster and more stable compared to the training without the second model 102, since the second model 104 does not have to learn the physical relations from data.

The aforementioned method and device 100 and in particular the machine learning system 400 better generalizes to vehicles or road conditions on which training data cannot be observed, since some of the relations between input and output are described by explicit relations and are thus not learned from data. In particular, e.g., gear ratios are highly dependent on the vehicle of interest. By integrating the physical model, the resulting device 100 or machine learning system 400 can generate gears for gear ratios not observed in the training data—e.g., even with a different number of gears.

Some additional advantages compared to taking a physical model only are as follows:

The physics based gear model only outputs a range of feasible gear values. To generate the actual gear sequence, one gear value per time step has to be selected from this range. Using a Generative Adversarial Network based model, this selection from within the minimum and maximum range is learned. Using heuristics, for example, selecting the optimal gear for engine performance, random selection from the range, selection from a top-k quantile of this range, instead will lead to a worse accuracy since these heuristics are often violated in the real world due to a number of underlying unobserved factors, e.g., driver behavior, overtaking other vehicles. This variance of unobserved variables is handled in a probabilistic nature of the Generative Adversarial Network-based generator, i.e., the first model 102.

Alternatively, discrete values may be determined by a trained artificial neural network comprising a suitable activation function, e.g., softmax, and implementing the physical model as second model 104. In this case, the artificial neural network may be trained to limiting input, e.g., the intermediate state 110, to the range $[\underline{x}_t, \overline{x}_t]$.

The physical model, i.e., the second model 104, depends on some variables that the model does not get as a direct input. Furthermore, intermediate features are computed from some input variables. These intermediate features are determined based on expert knowledge. Additionally or alternatively, knowing from the physical model that not only the feasible gear range but also the actual gear depends on these expert features, the first model 102, i.e., the generator, may be trained with these expert features, e.g., by adding these as inputs to the first model 102. In this way, the relation between these features and the actual gear at time step t can be learned from the first model 102.

The so trained models, the device 100 and/or the machine learning system 400 may execute the method described above for predicting gear characteristics over time as well.

The gear characteristics may be used for simulation of emissions of the vehicle. This simulation may be used for a probabilistic judgment of the compliance to exhaust limits, an optimization of a parametrization of an engine of the vehicle or a control of the vehicle. The simulation may be used for predictive vehicle control, drive train management and/or torque regeneration for vehicle drive trains comprising combustion engines, electrical engines or both.

The second model 104 and/or the third model 118 may not be present after the training. When the third model 118 is present after the training, the third model 118 may be used for determining or discriminating safe from unsafe gear characteristics over time. This ensures higher accuracy by the way of physical compliance and this ensures higher accuracy in downstream tasks.

Thus, downstream tasks may avoid unstable and/or unsafe regimes since the physically implausible inputs might make the downstream system unstable and/or unsafe.

In a preferred embodiment, the characteristic of gears over time is determined depending on a plurality of inputs for the second model 104 in response to a plurality of inputs for the first model 102. In addition, an exhaust characteristic for the vehicle may be estimated depending on the characteristic of gears over time and depending on a vehicle engine model.

What is claimed is:

1. A method for determining a state of a transmission for a vehicle, the method comprising the following steps:
   providing an input for a first model depending on a route information, a vehicle speed, a probabilistic variable including noise, and an output of a second model, wherein the first model is a generative model and the second model is a physical model;
   determining an output of the first model in response to the input for the first model, wherein the output of the first model characterizes the state of the transmission, wherein the first model includes a first layer that is trained to map the input for the first model determined depending on the route information, the vehicle speed, and the probabilistic variable, to an intermediate state, and wherein the first model includes a second layer that is trained to map the intermediate state to the state of the transmission depending on the output of the second model;
   providing an input for the second model depending on at least one vehicle state and/or the route information; and
   determining an output of the second model in response to the input for the second model, wherein the output of the second model characterizes at least one limit for the intermediate state.

2. The method according to claim 1, wherein the at least one vehicle state is defined by at least one geographical variable including at least one slope trajectory value, or at least one vehicle variable including at least one velocity trajectory value.

3. The method according to claim 1, wherein the at least one vehicle state is defined by at least one vehicle parameter including at least one of: (i) a transmission gear ratio, (ii) a differential gear ratio, (iii) a tire circumference, (iv) a vehicle engine idle speed, (v) a safety margin, (vi) a slope, (vii) a velocity, (viii) an engine speed, (ix) a power required by an auxiliary device, (x) a vehicle resistance, or (xi) a vehicle engine full-load power-speed curve.

4. The method according to claim 1, wherein the route information includes route features, and wherein the method further comprises extracting the route features from map information.

5. The method according to claim 1, wherein the route information includes at least one of: (i) a geographical characteristic including an absolute height or a road slope characteristic, (ii) a traffic flow characteristic including a time dependent average speed of traffic, (iii) a road characteristic including a number of lanes, or road curvature, (iv) a traffic control characteristic including a speed limit characteristic, a number of traffic lights, a number of stop signs, a number of yield signs, or a number of pedestrian crossing signs, or (v) a weather characteristic including an amount of rain at a predetermined time, a wind speed, or a presence of fog.

6. The method according to claim 1, further comprising:
   providing an input for a third model depending on the route information, the vehicle speed, and the state of the transmission; and
   determining an output of the third model in response to the input for the third model;
   wherein the output of the third model characterizes a score indicating an estimate of veracity for the state of the transmission;
   wherein the third model is trained to map the input for the third model determined depending on the route information, the vehicle speed, and the state of the transmission, to output of the third model characterizing the score indicating the estimate of veracity for the state of the transmission.

7. The method according to claim 6, wherein the route information and the vehicle speed is defined by a continuous or discrete series of values over time within a time period, wherein the first model includes a first recurrent neural network adapted to process values of the series of values of the time period, and the third model includes a second recurrent neural network adapted to process values of the series of values of the time period, and wherein the method further comprises processing the same values of the route information and the vehicle speed in the series of values of the time period by both the first model and the third model.

8. The method according to claim 7, wherein the probabilistic variable and the state of the transmission are defined by a continuous or discrete series of values over time within the time period.

9. The method according to claim 6, further comprising:
determining a characteristic of gears over time depending on a plurality of inputs for the second model and depending on a plurality of inputs for the first model.

10. The method according to claim 9, wherein the method further comprises estimating an exhaust characteristic for the vehicle depending on the characteristic of gears over time and/or the score, and depending on a vehicle engine model.

11. A device configured to determine a state of a transmission for a vehicle, the device configured to:
provide an input for a first model depending on a route information, a vehicle speed, a probabilistic variable including noise, and an output of a second model, wherein the first model is a generative model and the second model is a physical model;
determine an output of the first model in response to the input for the first model, wherein the output of the first model characterizes the state of the transmission, wherein the first model includes a first layer that is trained to map the input for the first model determined depending on the route information, the vehicle speed, and the probabilistic variable, to an intermediate state, and wherein the first model includes a second layer that is trained to map the intermediate state to the state of the transmission depending on the output of the second model;
provide an input for the second model depending on at least one vehicle state and/or the route information; and
determine an output of the second model in response to the input for the second model, wherein the output of the second model characterizes at least one limit for the intermediate state.

12. A machine learning system, comprising:
a first model;
a second model; and
a third model;
wherein the machine learning system is configured to determine a state of a transmission for a vehicle, the machine learning system configured to:
provide an input for the first model depending on a route information, a vehicle speed, a probabilistic variable including noise, and an output of the second model, wherein the first model is a generative model and the second model is a physical model;
determine an output of the first model in response to the input for the first model, wherein the output of the first model characterizes the state of the transmission, wherein the first model includes a first layer that is trained to map the input for the first model determined depending on the route information, the vehicle speed, and the probabilistic variable, to an intermediate state, and wherein the first model includes a second layer that is trained to map the intermediate state to the state of the transmission depending on the output of the second model;
provide an input for the second model depending on at least one vehicle state and/or the route information; and
determine an output of the second model in response to the input for the second model, wherein the output of the second model characterizes at least one limit for the intermediate state.

13. A method of training a machine learning system, the machine learning system including a first model, a second model, and a third model, wherein the machine learning system is configured to determine a state of a transmission for a vehicle, the machine learning system configured to: (i) provide an input for the first model depending on a route information, a vehicle speed, a probabilistic variable including noise, and an output of the second model, wherein the first model is a generative model and the second model is a physical model, (ii) determine an output of the first model in response to the input for the first model, wherein the output of the first model characterizes the state of the transmission, wherein the first model includes a first layer that is trained to map the input for the first model determined depending on the route information, the vehicle speed, and the probabilistic variable, to an intermediate state, and wherein the first model includes a second layer that is trained to map the intermediate state to the state of the transmission depending on the output of the second model, (iii) provide an input for the second model depending on at least one vehicle state and/or the route information, and (iv) determine an output of the second model in response to the input for the second model, wherein the output of the second model characterizes at least one limit for the intermediate state, the method comprising:
determining the state of the transmission depending on output of the first model and the second model in response to training data defining input data for the first model and the second model;
determining an output of the third model characterizing a score indicating an estimate of veracity for the state of the transmission; and
determining at least one parameter of the first model and/or the third model depending on the score wherein the input data for a training cycle includes the state of the transmission, the route information, and the at least one vehicle state.

14. A non-transitory computer-readable storage medium on which is stored a computer program including computer readable instructions for determining a state of a transmission for a vehicle, the computer readable instructions, when executed by a computer, causing the computer to perform the following steps:
providing an input for a first model depending on a route information, a vehicle speed, a probabilistic variable including noise, and an output of a second model, wherein the first model is a generative model and the second model is a physical model;
determining an output of the first model in response to the input for the first model, wherein the output of the first model characterizes the state of the transmission, wherein the first model includes a first layer that is trained to map the input for the first model determined depending on the route information, the vehicle speed, and the probabilistic variable, to an intermediate state, and wherein the first model includes a second layer that is trained to map the intermediate state to the state of the transmission depending on the output of the second model;
providing an input for the second model depending on at least one vehicle state and/or the route information; and
determining an output of the second model in response to the input for the second model, wherein the output of the second model characterizes at least one limit for the intermediate state.

\* \* \* \* \*